(12) United States Patent
Demirors et al.

(10) Patent No.: US 6,323,282 B1
(45) Date of Patent: Nov. 27, 2001

(54) BIMODAL RUBBERS AND RUBBER MODIFIED HIGH IMPACT MONOVINYLIDENE AROMATIC POLYMERS PRODUCED THEREFROM

(75) Inventors: Mehmet Demirors; David Schrader, both of Midland, MI (US); Jose M. Rego, Hulst (NL)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/553,298

(22) Filed: Apr. 20, 2000

Related U.S. Application Data

(60) Provisional application No. 60/134,567, filed on May 17, 1999.

(51) Int. Cl.[7] .................. C08F 255/00; C08F 255/08
(52) U.S. Cl. ..................... 525/191; 525/70; 525/71; 525/242; 525/241; 525/316
(58) Field of Search ................. 525/191, 70, 71, 525/242, 241, 316

(56) References Cited

U.S. PATENT DOCUMENTS 6,114,461  *  9/2000  Preti et al. ................ 525/298

FOREIGN PATENT DOCUMENTS

| | | |
|---|---|---|
| 418042 | 2/1994 | (EP) . |
| 754710 | 1/1997 | (EP) . |
| 277687 | 12/1998 | (EP) . |
| 62 292844 | 12/1987 | (JP) . |
| 95 15348 | 6/1995 | (WO) . |
| 99 09080 | 2/1999 | (WO) . |

* cited by examiner

*Primary Examiner*—James J. Seidleck
*Assistant Examiner*—Olga Asinovsky

(57) ABSTRACT

The present invention is related to a bimodal rubber characterized in that the bimodal rubber is a composition of linear, and branched rubber molecules, and has a broad, yet monomodal Mw distribution and rubber modified polymers produced therefrom.

7 Claims, No Drawings

BIMODAL RUBBERS AND RUBBER MODIFIED HIGH IMPACT MONOVINYLIDENE AROMATIC POLYMERS PRODUCED THEREFROM

This application claims the benefit of U.S. Provisional Application No. 60/134,567, filed May 17, 1999.

BACKGROUND OF THE INVENTION

The present invention relates to bimodal rubbers and rubber modified monovinylidene aromatic polymers produced therefrom.

A variety of rubbers have been used in producing rubber modified monovinylidene aromatic polymers. It is well known in the art that the balance of gloss, impact and rigidity properties of such rubber modified polymers are dependent on rubber particle size, particle size distribution, rubber level and flow properties. Typically, polymers comprising small rubber particles have high gloss, high rigidity and low impact properties, while polymers comprising large rubber particles have low gloss, low rigidity and high impact properties.

Standard rubbers, commonly known as linear butadiene homopolymer types, cannot attain the small particles sizes needed to obtain high gloss products. Block copolymers usually lead to small rubber particles, but are expensive. Star branched rubbers have been produced by anionic polymerization processes in order to achieve a high degree of coupling, as is described in EP-277,687. EP-277,687 also discloses a rubber modified polymer containing radial or branched polybutadiene rubber particles having a volume average diameter of 0.1 to 1.2 microns ($\mu$) and rubber particles containing either radial, branched or linear rubber having a volume average particle diameter of from 1 to 5$\mu$. However, while these compositions have high gloss, they do not have sufficient toughness and rigidity. EP-418,042 discloses a rubber modified monovinylidene aromatic polymer using radial or star branched rubber polymers, which have been partially coupled, and have a bimodal weight average molecular weight (Mw) distribution. Generally a rubber having a bimodal Mw distribution will typically produce rubber modified products having a bimodal particle size or a broad particle size distribution. Rubber modified resins produced using such rubbers generally have good gloss, tensile yield strength and izod impact balance. However, they also have lower Gardner impact properties and lower overall elongation properties. Additionally, rubber modified polymers having a narrow rubber particle size distribution have low gloss and tensile yield strength properties.

Therefore, it is highly desirable to produce rubber modified polymers using rubbers having a broad, yet monomodal rubber particle size distribution, while having improved tensile yield strength. Such polymers have the combined properties of increased practical toughness as indicated by Gardner impact and also rigidity as indicated by tensile yield strength.

Thus, there remains a need to produce a rubber having a broad yet monomodal Mw, which leads to a broad, yet monomodal rubber particle size distribution, with the desirable properties of good practical toughness and rigidity.

SUMMARY OF THE INVENTION

The present invention is directed to a bimodal diene rubber wherein 25 to 75 weight percent of the bimodal rubber is linear, and from 75 to 25 weight percent of the rubber is branched, based on the weight of total rubber, characterized in that the bimodal rubber has a broad, yet monomodal weight average molecular weight distribution.

In another aspect, the present invention is a rubber modified monovinylidene aromatic polymer produced using the bimodal rubber of the first aspect of the present invention.

The bimodal rubbers of the present invention are more cost effective than those having a distinct bimodal Mw distribution and produce rubber modified polymers having excellent rigidity, impact properties and practical toughness.

DESCRIPTION OF THE PREFERRED EMBODIMENTS

The present invention is directed to a bimodal diene rubber. The term bimodal, with respect to the rubber of the present invention, refers to the presence of two distinct molecular structures. Specifically, it refers to the presence of linear rubber molecules and branched rubber molecules. Linear rubber molecules refers to a straight chain of polymerized monomer and includes uncoupled and dicoupled rubber, wherein two polymeric chains or arms have been attached to a multifunctional coupling agent. Branched rubber molecules refers to tricoupled, tetracoupled, etc., wherein tricoupled rubber refers to having three polymeric chains attached to a multifunctional coupling agent, and a tetracoupled rubber refers to having four arms attached to a multifunctional coupling agent, and so on. Typically, the branched rubber can have up to 10 arms attached to a multifunctional coupling agent.

The bimodal rubber of the present invention typically contains from 25, generally from 30, preferably from 35, more preferably from 40, even more preferably from 45, and most preferably from 50 to 75, generally to 70, preferably to 65, more preferably to 60 and most preferably to 55 weight percent of each of the linear and branched rubber components, based on the total weight of the rubber.

The bimodal rubber is also characterized in that it has a broad, yet monomodal weight average molecular weight (Mw) distribution. The term monomodal, in reference to the Mw distribution, refers to a single, yet broad peak achieved when plotting the Mw for sequential fractions of the polymer produced. In other words, the Mw is plotted against different levels of monomer conversion during the polymerization. A broad Mw can be achieved by producing the bimodal rubber such that the linear molecules have a Mw which is less than, but near, the Mw of the branched molecules. Typically the Mw of the bimodal rubber is from 100,000 to 350,000, as measured using gel permeation chromatography and polybutadiene standards. The Mw of the branched rubber must be higher than that of the linear rubber by at least 25 percent, yet be near enough to the Mw of the linear rubber so as to appear to have a broad, yet monomodal Mw distribution. Although the linear rubber has a lower molecular weight than the branched, two distinct peaks are not achieved when plotting the Mw against monomer conversion.

The polydispersity or Mw/Mn of the bimodal rubber, wherein Mn is the number average molecular weight, is typically from 1.5 to 5.5. The bimodal rubber can also have a low 1,4 cis content of 60 weight percent or lower; or a high 1,4 cis content of greater than 60 weight percent.

Suitable diene monomers used to produce the bimodal diene rubbers of the present invention include alkadienes such as 1,3-conjugated dienes, e.g., butadiene, isoprene, chloroprene or piperylene. Most preferred monomers are 1,3-conjugated dienes, with 1,3-butadiene being especially preferred. Small amounts, for example up to 10 or 15 weight percent, of other monomers such as vinyl aromatics, e.g., styrene; alpha, beta-ethylenically unsaturated nitriles such as acrylonitrile; alpha-olefins such as ethylene or propylene, and the like can also be employed if the rubbers meet the other qualifications described herein.

The bimodal rubber of the present invention can be produced by a continuous anionic polymerization process wherein a mixture of uncoupled, dicoupled, tricoupled, tetracoupled, and so on, rubber molecules are obtained. Methods of obtaining the desired mixture of linear and branched rubber particles are well known by those skilled in the art. Alternatively, the linear rubber can be produced separately from the branched rubber, and the two combined.

Branched rubbers, as well as methods for their preparation, are known in the art and reference is made thereto for the purpose of this invention. Representative branched rubbers and methods for their preparation are described in Great Britain Patent No. 1,130,485 and in *Macromolecules,* Vol. II, No. 5, pg. 8, by R. N. Young and C. J. Fetters.

Star branched polymers, commonly referred to as polymers having designed branching, are conventionally prepared using a polyfunctional coupling agent, such as silicone tetrachloride or a polyfunctional initiator such as an organometallic anionic polymerization initiating compound. The initiator is typically an alkyl or aryl alkali metal compound, particularly lithium compounds with $C_{1-6}$ alkyl, $C_6$ aryl, or $C_{7-20}$ alkylaryl groups. Such initiators include the multifunctional compounds described, in U.S. Pat. Nos. 5,171,800 and 5,321,093, which are incorporated herein by reference. It is advantageous to use organolithium compounds such as ethyl-, propyl-, isopropyl-, n-butyl-, sec.-butyl-, tert.-butyl, phenyl-, hexyl-diphenyl-, butadienyl-, polystyryl-lithium, or the multifunctional compounds hexamethylene-dilithium, 1,4-dilithium-butane, 1,6-dilithium-hexane, 1,4-dilithium-2-butene, or 1,4-dilithium-benzene. Preferably, the initiator is n-butyl- and/or sec.-butyl-lithium.

Methods for preparing a polymer of butadiene using a coupling agent are illustrated in U.S. Pat. Nos. 4,183,877; 4,340,690; 4,340,691 and 3,668,162, whereas methods for preparing a polymer of butadiene using a polyfunctional initiator are described in U.S. Pat. Nos. 4,182,818; 4,264,749; 3,668,263 and 3,787,510, all of which are herein incorporated by reference.

Another aspect of the present invention is related to rubber modified monovinylidene aromatic polymers. Monovinylidene aromatic rubber modified polymers are derived from one or more vinyl aromatic monomers. Representative vinyl aromatic monomers include styrene, alkyl substituted styrenes such as alpha-alkyl-styrenes, e.g., alpha-methylstyrene, alpha-ethylstyrene; ring substituted styrenes, e.g., vinyltoluene, particularly p-vinyltoluene, o-ethylstyrene and 2,4-dimethylstyrene; ring substituted halostyrenes such as chlorostyrene, 2,4-dichloro-styrene and the like; styrene substituted with both halo and alkyl groups, such as 2-chloro-4-methylstyrene, vinyl anthracene; and mixtures thereof. Preferably styrene and/or alpha-methylstyrene is used as the vinyl aromatic monomer, with styrene being most preferred.

Comonomers may also be used in combination with the vinyl aromatic monomer, preferably in an amount of up to 40 percent by weight of the polymerizable monomer mixture. Representative comonomers include unsaturated nitriles, such as acrylonitrile; alkyl acrylates and alkyl methacrylates such as methyl methacrylate or n-butylacrylate; ethylenically unsaturated carboxylic acids; and ethylenically unsaturated carboxylic acid derivatives including anhydrides and imides, such as maleic anhydride and N-phenyl maleimide.

The amount of bimodal rubber initially dissolved in the vinyl aromatic monomer is dependent on the desired concentration of the rubber in the final rubber-reinforced polymer product, the degree of conversion during polymerization and the viscosity of the solution. The bimodal rubber is typically used in amounts such that the rubber-reinforced polymer product contains from about 2 to about 20 percent, preferably from about 3 to about 17 percent, and more preferably from about 3 to about 15 weight percent rubber, based on the total weight of the vinyl aromatic monomer and rubber components, expressed as rubber or rubber equivalent. The term "rubber" or "rubber equivalent" as used herein is intended to mean, for a rubber homopolymer, such as polybutadiene, simply the amount of rubber, and for a copolymer, the amount of the copolymer made up from monomer which when homopolymerized forms a rubbery polymer, such as for a butadiene-styrene copolymer, the amount of the butadiene component of the copolymer.

The polymerization of the vinyl aromatic monomer can be conducted in the presence of an initiator, including peroxide initiators such as peresters, e.g., tertiary butyl peroxybenzoate and tertiary butyl peroxyacetate, dibenzoyl peroxide, dilauroyl peroxide, 1.1-bis tertiarybutyl peroxycyclohexane, 1,3-bis tertiarybutylperoxy-3,3,5-trimethyl cyclohexane, di-cumyl peroxide, and the like. Photochemical initiation techniques can be employed if desired. Preferred initiators include dibenzoyl peroxide, tertiarybutylperoxy benzoate, 1,1-bistertiarybutylperoxy cyclohexane and tertiarybutylperoxy acetate. Initiators may be employed in amounts from 0 to 2000, preferably from 100 to 1500, parts by weight per million parts by weight of vinyl aromatic monomer.

Additionally, a solvent may also be used, including aromatic and substituted aromatic hydrocarbons such as benzene, ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. Preferred solvents include substituted aromatics, with ethylbenzene and xylene being most preferred. The solvent is generally employed in an amount of up to about 35 weight percent, preferably from about 2 to about 25 weight percent, based on the total weight of the solution.

Other materials may also be present in the polymerization of vinyl aromatic monomer, including plasticizers, e.g., mineral oil; flow promoters, lubricants, antioxidants, catalysts, mold release agents, or polymerization aids such as chain transfer agents, including alkyl mercaptans, e.g., n-dodecyl mercaptan. If employed, a chain transfer agent is typically present in an amount of from about 0.001 to about 0.5 weight percent based on the total weight of the polymerization mixture to which it is added.

The polymerization of the vinyl aromatic monomer is preferably conducted in one or more substantially linear stratified flow or so-called plug-flow type reactors, as described in U.S. Pat. No. 2,727,884, which is incorporated herein by reference.

The techniques of mass-polymerization, methods of producing rubber modified monovinylidene aromatic polymers and the conditions needed for producing the desired average particle sizes are well known to one skilled in the art.

The temperature at which the polymerization is conducted will vary according to the specific components, particularly initiator, but will generally vary from about 60 to about 190° C.

Crosslinking of the rubber in the resulting product and removal of the unreacted monomers, as well as any solvent, if employed, and other volatile materials is advantageously conducted employing conventional techniques, such as introducing the polymerization mixture into a devolatilizer, flashing off the monomer and other volatiles at elevated temperature, e.g., from 200 to 300° C. under vacuum and removing them from the devolatilizer.

As used herein, the volume average particle size refers to the diameter of the rubber particles, including all occlusions of monovinylidene aromatic polymer within the rubber particles. Volume average particle sizes and distributions may be measured using conventional techniques such as a Coulter Counter™ or, transmission electron microscopy image analysis. Large particles are measured using a $50\mu$ tube.

The bimodal rubber used in preparing the rubber modified polymers, produces a broad, monomodal particle size distribution. The volume average particle size achieved is dependent upon the size desired, and can be modified using well known techniques. Typically, the volume average particle size is from 0.3, generally from 0.4, preferably from 0.5, more preferably from 0.6, even more preferably from 0.7, and most preferably from 0.8 to 8, generally to 7, preferably to 6.5, more preferably to 6, even more preferably to 5 and most preferably to $4\mu$.

In one embodiment of the present invention, a high impact polystyrene (HIPS) composition is produced comprising a polymerized vinyl aromatic monomer, with dispersed particles of rubber having a broad particle size distribution. The size of the rubber particles are dependent upon the desired rigidity and impact properties of the polymer product. For HIPS compositions, the rubber particles are typically in the range of from 0.8 to $8\mu$.

Alternatively, the process may be utilized in the preparation of acrylonitrile-butadiene-styrene (ABS) type compositions, in which an alkenyl nitrile, generally acrylonitrile is used as a comonomer. For ABS compositions the particles are typically in the range of from 0.3 to $4\mu$.

Due to the excellent balance of rigidity and toughness properties, these rubber-reinforced compositions are useful in a wide variety of applications such as consumer electronics, food packaging, small household appliances, toys and furniture.

What is claimed is:

1. A rubber modified monovinylidene aromatic polymer produced from a vinyl aromatic monomer and a bimodal diene rubber wherein 25 to 75 weight percent of the bimodal rubber is of a linear structure, and from 75 to 25 weight percent is of a branched structure, characterized in that the bimodal rubber has a broad, yet monomodal weight average molecular weight distribution and produces a broad, monomodal particle size distribution, and the Mw of the rubber having a branched structure is higher than that of the rubber having a linear structure.

2. The rubber modified polymer of claim 1 wherein the vinyl aromatic monomer is styrene.

3. The rubber modified polymer of claim 2 wherein the rubber is dispersed as particles having a volume average particle size of from 0.8 to 8 $\mu$.

4. The rubber modified polymer of claim 1 wherein the vinyl aromatic polymer is copolymerized with acrylonitrile.

5. The rubber modified polymer of claim 4 wherein the rubber is dispersed as particles having a volume average particle size of from 0.3 to 4 $\mu$.

6. The rubber modified polymer of claim 1 wherein the rubber is a homopolymer of butadiene.

7. The rubber modified polymer of claim 1 wherein the rubber has a Mw of from 100,000 to 350,000, as measured using gel permeation chromatography and polybutadiene standards.

* * * * *